United States Patent [19]

Avakian et al.

[11] Patent Number: 4,741,864
[45] Date of Patent: May 3, 1988

[54] ULTRAVIOLET LIGHT STABLE FLAME RETARDED POLYCARBONATE BLENDS

[75] Inventors: Roger W. Avakian, Brasschaat, Belgium; Ronald J. Wroczynski, Pittsfield, Mass.

[73] Assignee: General Electric Company, Pittsfield, Mass.

[21] Appl. No.: 785,115

[22] Filed: Oct. 7, 1985

[51] Int. Cl.[4] .................. C09K 21/00; C08K 3/10; C08K 3/16

[52] U.S. Cl. .................. 252/609; 252/601; 260/DIG. 24; 524/281; 524/314; 524/411; 524/412; 525/433; 525/439

[58] Field of Search ............ 252/8, 7, 602, 609; 260/453 SP, DIG. 12; 525/922, 433, 439, 462, 469, 470; 524/411, 412, 314, 281, 341, 373, 417, 469, 604, 605, 64; 528/125, 126, 168, 171, 174

[56] References Cited

U.S. PATENT DOCUMENTS

| | | | |
|---|---|---|---|
| 3,852,393 | 12/1974 | Furukawa et al. | 524/412 |
| 3,953,650 | 4/1976 | Sauer et al. | 252/609 |
| 3,957,905 | 5/1976 | Sumoto et al. | 524/411 |
| 4,028,335 | 6/1977 | Fox | 524/281 |
| 4,152,348 | 5/1979 | Rabourn | 260/453 SP |
| 4,155,949 | 5/1979 | Kamiyama et al. | 524/412 |
| 4,177,181 | 12/1979 | Tsurumi et al. | 524/922 |
| 4,205,018 | 5/1980 | Nagasawa et al. | 525/404 |
| 4,209,427 | 6/1980 | Williams | 524/156 |
| 4,222,910 | 9/1980 | Tokuda | 524/156 |
| 4,223,100 | 9/1980 | Reinert | 524/412 |
| 4,256,625 | 3/1981 | Dachs | 528/168 |
| 4,256,627 | 3/1981 | Moser et al. | 260/45.75 N |
| 4,267,095 | 5/1981 | del Valle | 524/922 |
| 4,285,855 | 8/1981 | Tokuda | 524/162 |
| 4,316,838 | 2/1982 | Tokuda | 524/156 |
| 4,346,188 | 8/1982 | Costanzi et al. | 252/609 |
| 4,366,279 | 12/1982 | Tamioka et al. | 524/289 |

OTHER PUBLICATIONS

Hawley, 1981, The Condensed Chemical Dictionary-Tenth Edition, Van Nostrand Reinhold Co., New York, p. 830.

*Primary Examiner*—Stephen J. Lechert, Jr.
*Assistant Examiner*—Howard J. Locker

[57] ABSTRACT

Discoloration in aromatic carbonate polymers brought about by the addition of halogenated flame retardants is counteracted by the further addition of aliphatic polyester.

15 Claims, No Drawings

ULTRAVIOLET LIGHT STABLE FLAME RETARDED POLYCARBONATE BLENDS

This invention relates to aromatic carbonate polymer blends containing halogenated aromatic flame retardants rendered resistant to yellowing upon exposure to ultraviolet radiation. More particularly, this invention relates to aromatic carbonate polymer blends containing halogenated aromatic flame retardants which additionally contain small amounts of aliphatic polyester to color stabilize such blends upon exposure to ultraviolet radiation.

BACKGROUND OF THE INVENTION

Aromatic carbonate polymers are well-known thermoplastic materials which, due to their many advantageous properties, find use as thermoplastic engineering materials. The aromatic carbonate polymers exhibit, for example, excellent properties of toughness, impact resistance, heat resistance, and dimensional stability. Not only are molded parts prepared from aromatic carbonate polymers, but films and sheet materials as well. Noticeably lacking from their otherwise excellent property spectrum, aromatic carbonate polymers such as aromatic polycarbonate have less than desirable resistance to burning for certain applications. Thus, a wide number of flame retardant additives have been proposed for use in the aromatic polycarbonates to provide a degree of flame retardance to the finished article as necessary in any particular application.

Most often suggested to impart a mild flame retardance to the aromatic carbonate polymers is the addition of the simple charring agents such as the metal salts of aromatic sulfonic acids, specific examples of which may be found in U.S. Pat. Nos. 4,075,164 and 4,093,589. In instances where a greater degree of flame retardance is necessary, the halogenated aromatic flame retardants are employed. However, as is often the case with any additive to a thermoplastic blend, the addition of the halogenated aromatic flame retardants to the aromatic carbonate polymers produces undesirable side effects. This invention deals with a particular such side effect. The addition of the halogenated aromatic flame retardants to the aromatic carbonate polymer promotes UV instability particularly in the form of discoloration or yellowing after ultraviolet radiation exposure. This discoloration of the aromatic carbonate reduces clarity and alters appearance. Not only do transparent sheet, film, and molded articles suffer from this discoloration but likewise opaque sheet, film, and molded articles suffer as well.

Additives have been discovered which inhibit the discoloration or yellowing of flame retarded aromatic carbonate polymers after exposure to ultraviolet radiation. Thus, particularly where non-discolored aromatic carbonate polymer is desired, the utility of polycarbonate film, sheet, and molded parts is increased.

DESCRIPTION OF THE INVENTION

Briefly, according to the present invention, there are provided flame retarded aromatic carbonate polymer compositions having improved color stability to UV radiation comprising
  (a) an aromatic carbonate polymer selected from aromatic polycarbonate and aromatic poly(ester-carbonate);
  (b) an effective amount of a halogenated aromatic flame retardant; and
  (c) a color stabilizing amount of at least one effective aliphatic polyester;
and optionally comprising:
  (d) a reinforcing amount of filamentous glass reinforcement;
  (e) up to 80 weight parts of another thermoplastic resin per 20 weight parts aromatic carbonate polymer;
  (f) impact modifier; and
  (g) stabilizers, charring agents, and drip suppressants, etc.

Aromatic carbonate polymer generally includes both the polycarbonates and the copolyestercarbonates. The aromatic polycarbonate resins for use herein can be prepared by reacting a dihydric phenol with a carbonate precursor, such as phosgene, a haloformate or a carbonate ester. Generally speaking, such carbonate polymers may be typified as possessing recurring structural units of the formula:

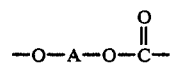

Figure I wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are:
2,2-bis(4-hydroxyphenyl)propane;
hydroquinone;
resorcinol;
2,2-bis-(4-hydroxyphenyl)pentane;
2,4'-dihydroxydiphenylmethane;
bis-(2-hydroxyphenyl)methane;
bis-(4-hydroxyphenyl)methane;
  bis-(4-hydroxy-5-nitrophenyl)methane;
  1,1-bis(4-hydroxyphenyl)ethane;
  3,3-bis(4-hydroxyphenyl)pentane;
  2,2'-dihydroxydiphenyl;
  2,6-dihydroxynaphthalene;
  bis-(4-hydroxydiphenyl)sulfone;
  bis-(3,5-diethyl-4-hydroxyphenyl)sulfone;
  2,2-bis-(3,5-dimethyl-4-hydroxyphenyl)propane;
  2,4'-dihydroxydiphenyl sulfone;
  5'-chloro-2,4'-dihydroxydiphenyl sulfone;
  bis-(4-hydroxyphenyl)diphenyl sulfone;
  4,4'-dihydroxydiphenyl ether;
  4,4'-dihydroxy-3,3'-dichlorodiphenyl ether;
  4,4'-dihydroxy-2,5-dihydroxydiphenyl ether;
and the like.

Other dihydric phenols which are also suitable for use in the preparation of the above polycarbonates are disclosed in U.S. Pat Nos. 2,999,835; 3,028,365; 3,334,154; and 4,131,575.

These aromatic polycarbonates can be manufactured by known processes, such as, for example and as mentioned above, by reacting a dihydric phenol with a carbonate precursor, such as phosgene, in accordance with methods set forth in the above-cited literature and U.S. 4,018,750 and 4,123,436, or by transesterification processes such as are disclosed in U.S. 3,153,008, as well as other processes known to those skilled in the art.

It is possible to employ two or more different dihydric phenols or a copolymer of a dihydric phenol with a glycol or with a hydroxy or acid terminated polyester or with a dibasic acid in the event a carbonate copolymer or interpolymer rather than a homopolymer is desired for use in the preparation of the polycarbonate mixtures of the invention. Branched polycarbonates are also useful, such as are described in U.S. Pat. No. 4,001,184. Also, there can be utilized blends of a linear polycarbonate and a branched polycarbonate. Moreover, blends of any of the above materials may be employed in the practice of this invention to provide the aromatic polycarbonate. In any event, the preferred aromatic carbonate polymer for use herein is a homopolymer derived from 2,2-bis(4-hydroxyphenyl)propane (bisphenol-A) and phosgene.

The copolyestercarbonate usually employed may generally be described as polymers comprising recurring carbonate groups,

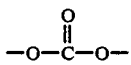

carboxylate groups,

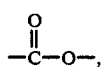

and aromatic carbocyclic groups in the linear polymer chain, in which at least some of the carboxylate groups and at least some of the carbonate groups are bonded directly to ring carbon atoms of the aromatic carboxylic groups. These copolyestercarbonate copolymers in general, are prepared by reacting a difunctional carboxylic acid or ester forming derivative, a dihydric phenol and a carbonate precursor.

The dihydric phenols useful in formulating the copolyestercarbonates for use herein may be represented by the general formula:

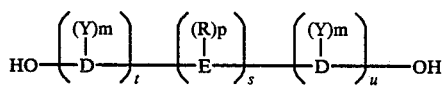

Figure II.

in which D is an aromatic group such as phenylene, biphenylene, naphthylene, anthrylene, etc. E may be an alkylene or alkylidene group such as methylene, ethylene, propylene, propylidene, isopropylidene, butylene, butylidene, isobutylidene, amylene, isoamylene, amylidene, isoamylidene and generally from one to twelve carbon atoms, inclusive, etc. Where E is an alkylene or alkylidene group, it may also consist of two or more alkylene or alkylidene groups, connected by a non-alkylene or non-alkylidene group such as an aromatic linkage, a tertiary amino linkage, an ether linkage, a carbonyl linkage, a silicon-containing linkage, or by a sulfur-containing linkage such as sulfide, sulfoxide, sulfone, etc. In addition, E may be a cycloaliphatic group of five to seven carbon atoms, inclusive (e.g. cyclopentyl, cyclohexyl), or a cycloalkylidene of five to seven carbon atoms inclusive, such as cyclohexylidene, a sulfur containing linkage, such as sulfide, sulfoxide or sulfone; an ether linkage; a carbonyl group; a tertiary nitrogen group, or a silicon containing linkage such as silane or siloxy. Other groups which E may represent will occur to those skilled in the art. R is hydrogen or a monovalent hydrocarbon group such as alkyl of one to eight carbon atoms, inclusive (methyl, ethyl, propyl, etc.), aryl (phenyl, naphthyl, etc.), aralkyl (benzyl, ethylphenyl, etc.) or cycloaliphatic of five to seven carbon atoms, inclusive (cyclopentyl, cyclohexyl, etc.). Y may be an inorganic atom such as chlorine, bromine, fluorine, etc.; and an organic group such as the nitro group, etc.; an organic group such as R above, or an oxy group such as OR, it being only necessary that Y be inert to and unaffected by the reactants and the reaction conditions. The letter m is any whole number from and including zero through the number of positions on D available for substitution; p is any whole number from and including zero through the number of available positions on E; t is a whole number equal to at least one, S is either zero or one, and u is any whole number including zero.

In the dihydric phenol compound represented by Formula II above, when more than one Y substituent is present, they may be the same or different. The same is true for the R substituent. Where s is zero in Formula II and u is not zero, the aromatic rings are directly joined with no intervening alkylene or other bridge. The positions of the hydroxyl groups and Y on the aromatic nuclear residues D can be varied in the ortho, meta, or para positions and the groupings can be in a vicinal, asymmetrical or symmetrical relationship, where two or more ring carbon atoms of the aromatic hydrocarbon residue are substituted with Y and hydroxyl group.

Examples of dihydric phenol compounds that may be employed in the copolyestercarbonate include:
2,2-bis-(4-hydroxyphenyl)propane (bisphenol-A);
2,4'-dihydroxydiphenylmethane;
bis-(2-hydroxyphenyl)methane;
bis-(4-hydroxyphenyl)methane;
bis-(4-hydroxy-5-nitrophenyl)methane;
bis-(4-hydroxy-2,6-dimethyl-3-methoxyphenyl)methane;
1,1-bis-(4-hydroxyphenyl)ethane;
1,2-bis-(4-hydroxyphenyl)ethane;
1,1-bis-(4-hydroxy-2-chlorophenyl)ethane;
1,1-bis-(2,5-dimethyl-4-hydroxyphenyl)ethane;
1,3-bis-(3-methyl-4-hydroxyphenyl)propane;
2,2-bis-(3-phenyl-4-hydroxyphenyl)propane;
2,2-bis-(3-isopropyl-4-hydroxyphenyl)propane;
2,2-bis-(4-hydroxynaphthyl)propane;
2,2-bis-(4-hydroxyphenyl)pentane;
3,3-bis-(4-hydroxyphenyl)pentane;
2,2-bis-(4-hydroxyphenyl)heptane;
bis-(4-hydroxyphenyl)phenylmethane;
bis-(4-hydroxyphenyl)cyclohexylmethane;
1,2-bis-(4-hydroxyphenyl)-1,2-bis-(phenyl) propane;
2,2-bis-(4-hydroxyphenyl)-1-phenylpropane;
and the like. Also included are dihydroxybenzenes typified by hydroquinone and resorcinol, dihydroxydiphenyls such as 4,4'-dihydroxydiphenyl; 2,2-dihydroxydiphenyl; 2,4'-dihydroxydiphenyl; dihydroxy-naphthalenes such as 2,6-dihydroxynaphthalene, etc.

Also useful are dihydric phenols wherein E is a sulfur containing radical such as the dihydroxy aryl exemplified by: bis-(4-hydroxyphenyl)sulfone; 2,4'-dihydroxydiphenyl sulfone; 5-chloro-2,4'-dihydroxy diphenyl sulfone; 3-chloro-bis-(4-hydroxyphenyl) sulfone; and 4,4'-dihydroxytriphenyldisulfone; etc. The preparation of these and other useful sulfones are described in U.S. Pat. No. 2,288,282. Polysulfones as well as substituted sulfones using halogen, nitrogen, alkyl radicals, etc. are also useful.

Dihydroxy aromatic ethers such as those described in U.S. Pat. No. 3,148,172 are useful as the dihydric phenol herein. The dihydroxy aromatic ethers may be prepared as described in U.S. Pat. No. 2,739,171. Illustrative of such compounds are the following:

4,4'-dihydroxydiphenyl ether;
4,4'-dihydroxytriphenyl ether;
the 4,3'-, 4,2'-, 4,1'-, 2,2'-, 2,3'-, etc. dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
4,4'-dihydroxy-3,3'-diisopropyldiphenyl ether;
4,4'-dihydroxy-3,3'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
4,4'-dihydroxydinaphthyl ether;
4,4'-dihydroxy-3,3'-dichlorodinaphthyl ether;
2,4-dihydroxytetraphenyl ether;
4,4'-dihydroxypentaphenyl ether;
4,4'-dihydroxy-2,6-dimethoxydiphenyl ether;
4,4'-dihydroxy-2,5-diethoxy-diphenyl ether, etc.

Mixtures of the dihydric phenols can also be employed and where dihydric phenol is mentioned herein, mixtures of such materials are considered to be included.

In general, any difunctional carboxylic acid or its reactive derivative such as the acid halide conventionally used in the preparation of polyesters may be used for the preparation of polyestercarbonates useful in formulating the compositions of the present invention. In general, the carboxylic acids which may be used include the aliphatic carboxylic acids, aliphatic aromatic carboxylic acids, or aromatic carboxylic acids. The aromatic dicarboxylic acids or their reactive derivatives such as the aromatic diacid halides are preferred as they produce the aromatic polyestercarbonates which are most useful, from the standpoint of physical properties, in the practice of the instant invention.

These carboxylic acids may be represented by the general formula:

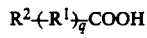
$R^2+R^1\rightarrow_q COOH$   Figure III.

wherein $R^1$ represents an alkylene, alkylidene or cycloaliphatic group in the same manner as set out above for E in Formula II; an alkylene, alkylidene or cycloaliphatic group containing ethylenic unsaturation; an aromatic radical such as phenylene, naphthylene, bisphenylene, substituted phenylene, etc.; two or more aromatic groups connected through non-aromatic linkages such as those defined by E in Formula II; or a divalent aliphatic aromatic hydrocarbon radical such as an aralkyl or alkaryl radical. $R^2$ is either a carboxyl or a hydroxyl group. The letter q represents the integer one where $R^2$ is a hydroxyl group and either zero or one where $R^2$ is a carboxyl group. Thus, the difunctional carboxylic acid will either be a monohydroxy monocarboxylic acid or a dicarboxylic acid. For purposes of the present invention the aromatic dicarboxylic acids or their reactive derivatives such as, for example, the acid halides, are preferred. Thus, in these preferred aromatic dicarboxylic acids, as represented by Formula II, $R^2$ is a carboxyl group and $R^1$ is an aromatic radical such as phenylene, biphenylene, naphthylene, substituted phenylene, etc., two or more aromatic groups connected through non-aromatic linkages; or a divalent aliphatic aromatic radical. Some nonlimiting examples of suitable preferred aromatic dicarboxylic acids which may be used in preparing the copolyestercarbonate resins of the instant invention include phthalic acid, isophthalic acid, terephthalic acid, homophthalic acid, o-, m-, and p-phenylenediacetic acid, the polynuclear aromatic acids such as diphenic acid, and 1,4-naphthalic acid. The aromatics may be substituted with Y groups in the same manner as the Formula I aromatics are substituted. These acids may be used individually or as mixtures of two or more different acids.

The carbonate precursor may be either a carbonyl halide, a carbonate ester, or a haloformate. The carbonyl halides which can be employed herein are carbonyl chlorides and carbonyl bromide. Typical of the carbonate esters which may be employed herein are diphenyl carbonate, di(halophenyl)carbonates such as di(chlorophenyl)carbonate, di(bromophenyl)carbonate, di(trichlorophenyl)carbonate, di(tribromophenyl)carbonate, etc., di(alkylphenyl)carbonates such as di(tolyl)carbonate, etc., di(naphthyl)carbonate, chloronaphthyl chlorophenyl carbonate, and the like. The haloformates suitable for use herein include bishaloformates of dihydric phenols such as bischloroformates of hydroquinone, etc. or glycols such as bishaloformates of ethylene glycol, neopentyl glycol, polyethylene glycol, etc. While other carbonate precursors will occur to those skilled in the art, carbonyl chloride, also known as phosgene is preferred.

The preparation of copolyestercarbonates which may be employed in the compositions of the present invention is described in U.S. Pat. Nos. 3,030,331; 3,169,121; 3,207,814; 4,194,038 and 4,156,069.

The copolyestercarbonates which are preferred in the practice of the present invention include the aromatic polyestercarbonates derived from dihydric phenols, aromatic dicarboxylic acids or their reactive ester forming derivatives such as the aromatic diacid halides, and phosgene. A particularly useful class of aromatic copolyestercarbonates is that derived from bisphenol-A, isophthalic acid, terephthalic acid, or a mixture of isophthalic acid and terephthalic acid, or the reactive derivatives of these acids such as terephthaloyl dichloride, isophthaloyl dichloride, or a mixture of isophthaloyl dichloride and terephthaloyl dichloride, and phosgene. The molar proportion of ester units in the copolyestercarbonate is generally from about 25 to 90 mole percent and preferably about 35 to 80 mole percent. The molar range of terephthalate units, the remainder of the copolymer ester units preferably comprising isophthalate units is generally from about 2 to 90 percent, and preferably from about 5 to about 25 percent.

Any of the conventional halogenated aromatic flame-retardants including the low molecular weight and polymeric flame-retardants, can be employed in the composition of the present invention. Suitable low molecular weight flame-retardants are those such as decabromodiphenyl ether. Suitable polymeric flame-retardants are, for example, brominated polystyrene; brominatedphenyl, acrylic and methacrylic, ester-containing polymers and copolymers; etc. Preferred polymeric flame-retardants are aromatic carbonate homopolymers having repeating units of the formula:

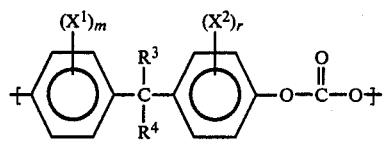

wherein $R^3$ and $R^4$ are hydrogen, (lower) alkyl or phenyl, $X^1$ and $X^2$ are bromo or chloro or mixtures thereof and m and r are from 1 to 4. It is especially preferred that $R^3$ and $R^4$ be methyl and that $X^1$ and $X^2$ be bromo. These materials may be prepared by techniques well known to those skilled in the art. Also preferred are aromatic carbonate copolymers in which from 25 to 75 weight percent of the repeating units comprise chloro or bromo substituted dihydric phenol, glycol or dicarboxylic acid units, e.g., A. D. Wambach, U.S. Pat. No. 3,915,926. A particularly preferred flame retardant herein is an aromatic copolycarbonate of 50:50 mole ratio of bisphenol-A and tetrabromobisphenol-A prepared like Procedure A of U.S. Pat. No. 3,915,926.

Though not commonly employed in the aromatic carbonate polymers, the flame retardants used herein, may be used with a synergist, particularly inorganic or organic antimony compounds. Such compounds are widely available or can be made in known ways. In preferred embodiments, the type of antimony compound used is not critical, being a choice primarily based on economics. For example, as inorganic compounds there can be used antimony oxide ($Sb_2O_3$); antimony phosphate; $KSb(OH)_6$; $NH_4SbF_6$; $SbS_3$; and the like. A wide variety of organic antimony compounds can also be used, such as antimony esters with organic acids; cyclic alkyl antimonites; aryl antimonic acids and the like. Illustrative of the organic antimony compounds, including inorganic salts of such compounds, are: KSb tartrate; Sb caproate; $Sb(OCH_2CH_3)_3$; $Sb(OCH(CH_3)CH_2CH_3)$; Sb polymethylene glycolate; triphenyl antimony; and the like; especially preferred is antimony oxide.

The amount of halogenated aromatic flame retardant used is not critical to the invention, so long as it is at least sufficient to reduce the flammability of the polyester resin. Those skilled in the art are well aware that the amount will vary with the nature of the resin and with the efficiency of the additive. In general, however, the amount of additive will be from 0.5 to 50 parts by weight per 100 parts of resin. A preferred range will be from about 3 to 50 parts and an especially preferred range will be from about 8 to 45 parts of additive per 100 parts of resin. Synergists, e.g., antimony oxide, if present, will be used at about 2 to 15 parts by weight per 100 parts of resin.

Suitable aliphatic polyesters for use herein are principally the hydroxy end-capped reaction products of hydroxy-containing acids, diacids, and diols wherein the hydroxy-containing acids, the diacids, and the diols comprise at least 50% by number aliphatic nonalicyclic hydroxy-containing acids, diacids, and diols. Preferably, the hydroxy-containing acids, diacids, and diols are entirely aliphatic. Of course, aliphatic polyesters may be polymerized from the combination of all three of the above components, from the hydroxy-containing acid alone, or from the diacids and diols and from other suitable combinations as is apparent to those skilled in the art. Generally, however, the aliphatic polyesters are polymerized from either the hydroxy-containing acids alone or from diacids and diols.

A preferred aliphatic polyester is polymerized from hydroxy-containing acids. Such acids may be straight chain acids where the carboxylic acid group and the hydroxy group are not reacted or such acids may be cylic esters of themselves where the acid group and the hydroxy group have self-condensed to form a cylic ester link. Most commonly, the cylic esters such as the lactones are used as the hydroxy-containing acid. For example, Epsilon-caprolactones have the general formula:

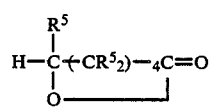

Figure IV.

where $R^5$ is hydrogen or lower alkyl, that is, a linear or branched alkyl group having from 1 to 4 carbon atoms such as methyl, ethyl, propyl, isopropyl, butyl and t-butyl. Usually at least six of the $R^5$ groups are hydrogen and the remaining three are hydrogen, methyl or any combination thereof. Examples of suitable lactones are beta-propiolactone, gamma-butyrolactone, delta-valerolactone, epsilon-caprolactone and the like.

In order to obtain the hydroxy end-cap on polyesters polymerized from hydroxy-containing acids, it is necessary that a y-functional polyhydric initiator, $R^6(OH)_y$, be employed where y has a value of at least 2 and usually no more than 6. Though polyhydric initiators with higher functionality are suitable, preferred polyhydric initiators emcompassed by $R^6(OH)_y$ are those wherein y is 2 such as for example glycol, dimethylolethane, dimethylolpropane, 1,4-butanediol, 1,6-hexanediol, diethylene glycol, di-1,2-propylene glycol, oxyethylated and/or oxypropylated adducts of such compounds such as, for example, ethylene oxide adducts of dimethylolpropane, and mixtures of any of the aforesaid initiators. It is evident, therefore, that $R^6$ is a saturated, aliphatic radical having at least two carbon atoms and consists of carbon and hydrogen, or carbon, hydrogen and oxygen where oxygen is present solely as ether oxygen, as in diethylene glycol or the aforementioned oxyalkylated adducts. The more commonly employed initiators have no more than 10 carbon atoms.

Hydroxy-containing acid type aliphatic polyesters are prepared by methods well known to those skilled in the art. For example, the preparation of a preferred such polyester, the polyfunctional epsilon-caprolactone polyol, is described in U.S. Pat. No. 3,169,945, the teachings of which are incorporated herein by reference. However, in contradiction to what is taught therein, and to avoid potentially harmful interactions with the aromatic carbonate polymer, a titanium based catalyst should not be used in the preparation of the aliphatic polyester unless suitable stabilizers are present in the blend. Recommended molecular weights for the hydroxy-containing acid type polyesters range from about 500 to about 50,000.

A second preferred aliphatic polyester is polymerized from diacids and diols. As stated above, the majority of the diacids and diols should be aliphatic diacids and diols.

Suitable aliphatic diacids may have a straight or branched-chain arrangement of the constituent carbon atoms and may be saturated or unsaturated. Suitable saturated aliphatic diacids include adipic, azelaic, sebacic, malic, glutaric, malonic, pimelic, suberic, 2-methylsuccinic, 2,3-dimethyl succinic, 2,2-dimethyl succinic, 3,3-diethyl glutaric, 3,3-dimethyl glutaric, 2,2-dimethyl glutaric, and the like. Suitable unsaturated aliphatic diacids include; maleic, fumaric, itaconic, and the like. Preferably, the diacid is a saturated aliphatic diacid. Other diacids which may be present in a lesser amount are the aromatic or cycloaliphatic diacids, for example, phthalic, isophthalic, terephthalic, tetrahydrophthalic, hexahydrophthalic, and the like. Anhydrides of these acids, where they exist, can also be employed, and are incompassed by the term "diacid".

Suitable aliphatic diols may be substituted or unsubstituted and saturated or unsaturated. Suitable saturated diols include; ethylene glycol, 1,2-propane diol; 1,3-propanediol; 1,2-butanediol; 1,3-butanediol; 1,4-butanediol; 2,3-butanediol; 1,6-hexanediol; 2,4-pentanediol; 1,5-pentanediol; 2,5-hexanediol; 2-methyl-1,3-pentanediol; 2-methyl-2,4-pentanediol; 2,4-heptanediol; 2-ethyl-1,3-hexanediol; 2,2-dimethyl-1,3-propanediol; 2,2-diethyl-1,3-propanediol; 2,2-diethyl-1,3-butanediol. Suitable unsaturated aliphatic diols include, for example 2-butene-1,4-diol, diethylene glycol, and the like. Other diols which may be used in lesser amount include, aromatic and cycloaliphatic diols such as, for example, 1,4-cyclohexanedimethanol, 1,2-cyclohexanediol, 1,4-cyclohexanediol 2,2-bis(4,4'-dihydroxyphenyl)propane, and the like.

An excess of diol or polyhydric material should be present to achieve the recommended hydroxy termination of the diacid-diol, aliphatic polyester. Those skilled in the art may determine the proper amounts and methods of polymerization necessary to insure hydroxy termination depending on the degree of polymerization and branching. Branched polymers of this type are suitable and are obtained by the addition of, for example, trimethylol propane, 1,2,4-butane triol, and the like at the time of polymerization.

A particular diacid-diol aliphatic polyester found useful herein is one polymerized from adipic acid, butanediol, and ethylene glycol with a molecular weight of about 3000. Such an aliphatic polyester and similar polyesters are readily available on the market.

The diacid-diol aliphatic polyesters described herein are polymerized by methods well known to those skilled in the art generally in the presence of a strong acid. Molecular weights for this polyester used herein runs from greater than about 500 through about 15,000. As stated above, titanium based catalyst should be avoided in the polymerization of polyester for blending with aromatic carbonate polymer. Tin catalysts are preferred.

In order to obtain the color stabilizing effect desired herein the above aliphatic polyesters should be added to the aromatic carbonate polymer compositions in at least an amount to achieve the color stabilizing effect. Generally, this should require at least about ½ weight percent aliphatic polyester for each 100 parts by weight total resin content. Of course, the color stabilizing effect of the aliphatic polyesters will be observed at very high contents of the polyester in flame retarded molding compositions but generally from the standpoint of other properties, it is not desirable to add more than about 20 weight parts aliphatic polyester for each 100 parts by weight total resin content.

The compositions of this invention may further contain one or more reinforcing agents including glass fiber. Typical reinforcing agents useful for the invention include but are not limited to, glass fiber, talc, mica or combinations thereof.

The filamentous glass which may be employed as reinforcement in the present compositions is well known to those skilled in the art and is widely available from a number of manufacturers. For compositions ultimately to be employed for electrical uses, it is preferred to use fibrous glass filaments comprised of lime-aluminum borosilicate glass that is relatively soda-free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastic reinforcement are made by mechanical pulling. The filament diameters range from about 0.00012 to 0.00075 inch but this is not critical to the present invention.

The length of the glass filaments and whether or not they are bundled into fibers and the fibers bundled in turn to yarns, ropes or rovings, or woven into mats and the like are also not critical to the invention. However, in preparing the molding compositions it is convenient to use the filamentous glass in the form of chopped strands of from about ⅛" to about 2" long. In articles molded from the compositions on the other hand, even shorter lengths will be encountered because, during compounding considerable fragmentation will occur. This is desirable, however, because the best properties are exhibited by thermoplastic injection molded articles in which the filament lengths lie between about 0.000005" and 0.125 (⅛").

In general, best properties will be obtained if the filamentous glass reinforcement comprises from about 2.5 to about 90% by weight based on the combined weight of glass and resin, and preferably from about 5 to about 55% by weight. It is especially preferred that the glass comprise from about 20 to about 40% by weight based on the combined weight of glass and resin. Generally, for direct molding use, up to about 60% of glass can be present without causing flow problems. However, it is useful also to prepare the compositions containing substantially greater quantities, e.g., up to 80–90% by weight of glass. These concentrates can be custom blended with resins that are not glass reinforced to provide any desired glass content of a lower value.

The resin component in the molding compositions of the present invention may include in addition to the aromatic carbonate polymer resin up to 80 weight parts of other thermoplastic resins per 20 weight parts of aromatic carbonate polymer resin. Other suitable thermoplastic resins which may be used include acrylic and methacrylic polymers or copolymers; poly(ethylene terephthalate); epoxy resins; poly(1,4-butylene terephthalate); polyetherimide; phenylene oxide based resins such as polyphenylene oxide and blends of polyphenylene oxide and styrene resins; polyaryl ethers; polyesters; polyethylene; polyphenylene sulfides; polypropylene; polysulfones; ethylene polymers such as ethyl vinyl acetates; and ordered aromatic copolymers, etc.

Furthermore, the composition of the present invention may further comprise an effective amount of any of the known impact modifiers useful for polyesters and polyester blends. These may be added to the compositions by themselves or in combination with a suitable carrier thermoplastic.

The preferred impact modifiers generally comprise an acrylic or methacrylic grafted polymer of a conjugated diene or an acrylate elastomer, alone or copolymerized with a vinyl aromatic compound. Especially preferred grafted polymers are the core-shell polymers of the type available from Rohm & Haas, for example Acryloid KM653, Acryloid KM330 and Acryloid KM611. In general these impact modifiers contain units derived from butadiene or isoprene, alone or in combination with a vinyl aromatic compound, or n-butyl acrylate, alone or in combination with a vinyl aromatic compound. The aforementioned impact modifiers are believed to be disclosed in Fromuth, et al., U.S. Pat. Nos. 4,180,494; Owens, 3,808,180; Farnham, et al., 4,096,202; and Cohen, et al., 4,260,693, all incorporated herein by reference. Most preferably, the impact modifier will comprise a two stage polymer having either a butadiene or n-butyl acrylate based rubbery core and a second stage polymerized from methylmethacrylate alone or in combination with styrene. Also present in the first stage are cross linking monomers and graft linking monomers. Examples of the cross linking monomers include 1,3butylene diacrylate, divinyl benzene and butylene dimethacrylate. Examples of graft linking monomers are allyl acrylate, allyl methacrylate and diallyl maleate.

Additional preferred impact modifiers are of the type disclosed in U.S. Pat. No. 4,292,233, incorporated by reference. These impact modifiers comprise, generally, a relatively high content of a cross-linked butadienepolymer grafted base having grafted thereon acrylonitrile and styrene. Other suitable impact modifiers include, but are not limited to ethylene vinyl acetate, ethylene ethylacrylate copolymers, etc.

Other additives, to achieve desired properties may, of course, be added. Viscosity controlling agents, charring agents, drip suppressants, color stabilizers and the like, may be employed. Aromatic carbonate polymer blends containing these materials are well known to those skilled in the art.

The method of blending the compositions of this invention is not critical and can be carried out by conventional techniques. One convenient method comprises blending the aromatic carbonate polymer and other ingredients in powder or granular form, extruding the blend and comminuting into pellets or other suitable shapes.

The ingredients are combined in any usual manner, e.g., by dry mixing or by mixing in the melted state in an extruder, on a heated mill or in other mixers.

Although it is not essential, best results are obtained if the ingredients are precompounded, pelletized and then molded. Precompounding can be carried out in conventional equipment. For example, after carefully predrying the aromatic carbonate polymer resin, other ingredients, and, optionally, other additives and/or reinforcements, a single screw extruder is fed with a dry blend of the composition, the screw employed having a long transition section to insure proper melting. On the other hand, a twin screw extrusion machine, can be fed with resins and additives at the feed port and reinforcement down stream. In either case, a generally suitable machine temperature will be about 230° to 300° C.

The precompounded composition can be extruded and cut or chopped into molding compounds, such as conventional granules, pellets, etc. by standard techniques.

The compositions can be molded in any equipment conventionally used for thermoplastic compositions. For example, good results will be obtained in an injection molding machine, e.g. of the Newbury type, with conventional cylinder temperatures, e.g., 260° C. and conventional mold temperatures e.g., 65° C. If necessary, depending on the molding properties of the aromatic carbonate polymer, the amount of additives and/or reinforcing filler and the rate of crystallization of the aromatic carbonate polymer component, those skilled in the art will be able to make the conventional adjustments in molding cycles to accommodate the composition.

The compositions of this invention may be used alone as molding pellets or mixed with other polymers and may contain additional, non-reinforcing fillers, such as wood flour, cloth fibers, and the like, as well as pigments, dyes, stabilizers, plasticizers, and the like. One skilled in the art may readily determine which are necessary and suitable for a particular application.

DESCRIPTION OF THE PREFERRED EMBODIMENTS

The following examples illustrate the preparation of certain compositions within the scope of this invention. They are not to be construed to limit the invention in any manner whatsoever. All parts, except as otherwise indicated, are by weight.

DESCRIPTION OF TESTS

YELLOWNESS Index $\Delta Y_{(i)}$— Made on a Pacific-Scientific Spectrogard II in accordance with ASTM-D1925. Unless otherwise indicated, the value shown for $\Delta Y_{(i)}$ is the average of determinations for two samples.

Color Index $\Delta E$— Total color change $\Delta E$ was determined in Hunter scale units using the C illumination on a Pacific-Scientific Spectrogard II unit in accordance with the manufacturer's instructions.

Sample Preparation

The following formulations in weight parts were extruded at from 270° to 280° C. and injection molded into test plaques $2\frac{1}{2}'' \times 2\frac{1}{2}'' \times \frac{1}{8}''$ in size using a melt temperature of from 270° to 285° C. and a mold temperature of from 50° to 80° C. Samples, as indicated contain:

| | |
|---|---|
| Brominated Flame Retardant | poly(bisphenol-A-tetrabromobisphenol-A-carbonate) resin |
| Charring Agent | chlorinated sulfonate salt |
| Drip Suppressant | 20/80 by weight poly(tetrafluoroethylene)/poly-(bisphenol-A-carbonate)blend |
| Stabilizer | phosphite compound |
| Pigment | off-white color |
| Impact Modifier | acrylic core-shell rubber, ACRYLOID KM-330, Rohm and Hass, Philadelpha, PA |

EXAMPLES 1–8

| | 1 | 2 | 3 | 4 | 5 | 6 | 7 | 8 |
|---|---|---|---|---|---|---|---|---|
| Poly-carbonate[1] | 100 | 75 | 75 | 100 | 75 | 75 | 75 | 75 |
| Brominated Flame | — | 25 | 25 | — | 25 | 25 | 25 | 25 |

-continued

|  | 1 | 2 | 3 | 4 | 5 | 6 | 7 | 8 |
|---|---|---|---|---|---|---|---|---|
| Retardants | | | | | | | | |
| Aliphatic Polyester[3] | — | — | 7 | — | — | 3.5 | 7.0 | 15 |
| Charring Agent | 0.80 | 0.80 | 0.80 | 0.80 | 0.80 | 0.80 | 0.80 | 0.80 |
| Drip Suppressant | 0.75 | 0.75 | 0.75 | 0.75 | 0.75 | 0.75 | 0.75 | 0.75 |
| Stabilizer | 0.05 | 0.05 | 0.05 | 0.05 | 0.05 | 0.05 | 0.05 | 0.05 |
| Pigment | — | — | — | 1.22 | 1.22 | 1.22 | 1.22 | 1.22 |
| Impact Modifier | — | — | — | — | — | — | — | — |
| $\Delta Y_{i(avg)}$ | 5.0 | 9.6 | 6.3 | 0.6 | 1.1 | 0.8 | 0.3 | −0.3 |
| $\Delta E_{(avg)}$ | 2.0 | 6.9 | 6.3 | 0.2 | 0.7 | 0.5 | 0.2 | 0.2 |

[1]poly(bisphenol-A-carbonate) resin (i.v. = 0.52 in chloroform at 27° C.), LEXAN 140 resin, General Electric Company, Pittsfield, MA
[3]poly(epsilon-caprolactone) resin, (r.v. = 0.3 at 0.2 g/dl. in benzene at 30° C.)

EXAMPLES 9–10

|  | 9 | 10 |
|---|---|---|
| Polycarbonate[2] | 65 | 65 |
| Brominated Flame Retardant | 35 | 35 |
| Aliphatic Polyester[4] | — | 12 |
| Charring Agent | 0.80 | 0.80 |
| Drip Suppressant | 0.75 | 0.75 |
| Stabilizer | 0.50 | 0.50 |
| Pigment | 1.22 | 1.22 |
| Impact Modifier | — | — |
| $\Delta Y_{i(avg)}$ | 1.4 | 0.2 |
| $\Delta E_{(avg)}$ | 0.7 | 0.1 |

[2]poly(bisphenol-A-carbonate) resin (i.v. = 0.57 in chloroform at 27° C.), LEXAN 100 resin, General Electric Company, Pittsfield, MA
[4]poly(ethylene glycol-1,4-butanediol-adipate), MW = 2000, ADMEX 2056 resin, Sherex Company

EXAMPLES 11–13

|  | 11 | 12 | 13 |
|---|---|---|---|
| Polycarbonate[1] | 80 | 80 | 80 |
| Brominated Flame Retardant | 20 | 20 | 20 |
| Aliphatic Polyester[4] | — | 5 | 7 |
| Charring Agent | 0.80 | 0.80 | 0.80 |
| Drip Suppressant | 0.50 | 0.50 | 0.50 |
| Stabilizer | 0.05 | 0.05 | 0.05 |
| Pigment | 1.20 | 1.20 | 1.20 |
| Impact Modifier | — | 3.0 | 3.0 |
| $\Delta Y_{i(avg)}$ | 1.8 | 0.8 | 0.6 |
| $\Delta E_{(avg)}$ | 0.9 | 0.4 | 0.3 |

[1]poly(bisphenol-A-carbonate) resin (i.v. = 0.52 in chloroform at 27° C.), LEXAN 140 resin, General Electric Company, Pittsfield, MA
[4]poly(ethylene glycol-1,4-butanedol-adipate), MW = 2000, ADMEX 2056 resin, Sherex Company

EXAMPLES 14–15

|  | 11 | 14 | 15 |
|---|---|---|---|
| Polycarbonate[1] | 80 | 80 | 80 |
| Brominated Flame Retardant | 20 | 20 | 20 |
| Aliphatic Polyester[3] | — | 5 | 7 |
| Charring Agent | 0.80 | 0.80 | 0.80 |
| Drip Suppressant | 0.50 | 0.50 | 0.50 |
| Stabilizer | 0.05 | 0.05 | 0.05 |
| Pigment | 1.20 | 1.20 | 1.20 |
| Impact Modifier | — | — | — |
| $\Delta Y_{i(avg)}$ | 1.8 | 0.5 | 0.2 |
| $\Delta E_{(avg)}$ | 0.9 | 0.3 | 0.2 |

[1]poly(bisphenol-A-carbonate) resin (i.v. = 0.52 in chloroform at 27° C.), LEXAN 140 resin, General Electric Company, Pittsfield, MA
[3]poly(epsilon-caprolactone) resin, (r.v. = 0.3 at 0.2 g/dl. in benzene at 30° C.)

What is claimed is:

1. A flame retarded aromatic carbonate polymer composition having improved color stability to UV radiation comprising
   a. an aromatic carbonate polymer selected from the group consisting of aromatic polycarbonate and aromatic poly(ester-carbonate);
   b. an amount of halogenated aromatic flame retardant effective for flame retardance; and
   c. an amount of at least one aliphatic polyester effective for color stability.

2. The composition of claim 1 wherein said aromatic carbonate polymer is aromatic polycarbonate.

3. The composition of claim 1 wherein said aromatic carbonate polymer is an aromatic poly(ester-carbonate).

4. The composition of claim 1 which additionally contains a filamentaous glass reinforcement.

5. The composition of claim 1 which additionally contains up to 80 weight parts of another thermoplastic resin per 20 weight parts said aromatic carbonate polymer.

6. The composition of claim 1 which additionally contains an impact modifier.

7. The composition of claim 1 wherein said aliphatic polyester comprises the reaction products of members selected from the group consisting of hydroxy-containing acids, diacids, diols, and mixtures thereof wherein said hydroxy-containing acids, said diacids, and said diols comprise at least 50% by number aliphatic non-alicyclic hydroxy-containing acids, diacids and diols.

8. The composition of claim 7 wherein said hydroxycontaining acids, said diacids, and said diols are entirely aliphatic and non-alicylic.

9. The composition of claim 7 wherein said aliphatic polyester comprises reaction products of hydroxy-containing acids.

10. The composition of claim 9 wherein said aliphatic polyester consists essentially of the reaction products of said hydroxy-containing acids and a polyfunctional alcohol with 2 or more hydroxy functionalities.

11. The composition of claim 7 wherein said aliphatic polyester comprises the reaction products of said diacids and diols.

12. A composition of claim 11 wherein said aliphatic polyester consists essentially of the reaction produce of said diacids and said diols.

13. The composition of claim 1 which contains from about ½ weight parts to about 20 weight parts aliphatic polyester for each 100 parts by weight total resin content.

14. A flame retarded aromatic carbonate polymer composition having improved color stability to UV radiation comprising
   a. an aromatic carbonate polymer selected from the group consisting of aromatic polycarbonate and aromatic poly(ester-carbonate);
   b. an amount of brominated aromatic flame retardant effective for flame retardance; and
   c. an amount of at least one aliphatic polyester effective for color stability.

15. a composition that is in claim 1 wherein the aromatic carbonate polymer is poly(bisphenol-A-carbonate) resin; the brominated flame retardant is poly(bisphenol-A-tetrabromo bisphenol-a-carbonate) resin and the aliphatic polyester is selected from the group consisting of (poly-epsilon-caprolactone) resin and poly(ethylene glycol-1,4-butanediol-adipate).

* * * * *